US 6,714,679 B1

(12) United States Patent
Scola et al.

(10) Patent No.: US 6,714,679 B1
(45) Date of Patent: Mar. 30, 2004

(54) BOUNDARY ANALYZER

(75) Inventors: Joseph Scola, Medfield, MA (US); Lowell Jacobson, Grafton, MA (US)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 09/245,163

(22) Filed: Feb. 5, 1999

Related U.S. Application Data

(60) Provisional application No. 60/073,831, filed on Feb. 5, 1998, and provisional application No. 60/118,706, filed on Feb. 4, 1999.

(51) Int. Cl.[7] .................................................. G06K 9/48
(52) U.S. Cl. ...................... 382/199; 345/442; 345/443; 382/103; 382/151; 382/153; 382/202; 382/203; 382/294
(58) Field of Search ................................ 382/151, 153, 382/199, 202, 203–205, 215, 241, 293, 103, 294; 345/443, 442

(56) References Cited

U.S. PATENT DOCUMENTS

| | | | |
|---|---|---|---|
| 4,183,013 A | | 1/1980 | Agrawala et al. |
| 4,472,056 A | | 9/1984 | Nakagawa et al. |
| 4,644,583 A | | 2/1987 | Watanabe et al. |
| 4,712,248 A | * | 12/1987 | Hongo ........................ 382/199 |
| 4,771,469 A | | 9/1988 | Wittenburg |
| 4,868,752 A | | 9/1989 | Fujii et al. |
| 4,876,728 A | | 10/1989 | Roth |
| 5,168,530 A | | 12/1992 | Peregrim et al. |
| 5,189,711 A | | 2/1993 | Weiss et al. |

(List continued on next page.)

OTHER PUBLICATIONS

J.F.O'Callaghan, "Recovery of Perceptual Shape Organizations from Simple Close Boundaries" *Computer Graphics and Image Processing* (1974) 3, (pg.'s 300–312) CSIRO Division of Computing Research, Canberra, A.C.T. 2601, Australia; Academic Press, Inc.

(List continued on next page.)

*Primary Examiner*—Bhavesh M. Mehta
*Assistant Examiner*—Gregory Desire
(74) *Attorney, Agent, or Firm*—Tracy Calabresi

(57) ABSTRACT

A method and apparatus are disclosed for analyzing a boundary of an object. An embodiment for determining defects of a boundary to sub-pixel precision and an embodiment for fast correlation scoring are disclosed. The boundary is analyzed by matching a first boundary, such as a model of an ideal object boundary, to a second boundary, such as the boundary of an object being produced at a factory. The boundaries are represented as a set of indexed vertices, which are generated by parsing the boundaries into a set of segments. One embodiment refines the parse through merging segments and reassigning data points near the endpoints of the segments. The model produced is very accurate and is useful in other applications. To analyze the boundaries, the sets of indexed vertices are matched, and optionally the segmentation of the second boundary is refined to increase the extent of matching. The extent of matching yields a correlation score and/or the matching allows a characteristic class of the first set of segments to be associated with the second set of segments. The class and data points of the runtime segments are used to measure defects in the second set of segments, and thus in the boundary of the object.

45 Claims, 8 Drawing Sheets

U.S. PATENT DOCUMENTS

| | | | |
|---|---|---|---|
| 5,278,983 A | | 1/1994 | Kawabe et al. |
| 5,500,737 A | | 3/1996 | Donaldson et al. |
| 5,546,476 A | | 8/1996 | Mitaka et al. |
| 5,548,326 A | | 8/1996 | Michael |
| 5,611,000 A | | 3/1997 | Szeliski |
| 5,617,459 A | | 4/1997 | Makram-Ebeid et al. |
| 5,751,853 A | | 5/1998 | Michael |
| 5,796,868 A | * | 8/1998 | Dutta-Choudhury ........ 382/199 |
| 5,978,512 A | * | 11/1999 | Kim ........................... 382/241 |
| 5,978,520 A | * | 11/1999 | Maruyama et al. ......... 382/194 |
| 5,987,173 A | * | 11/1999 | Kohno et al. ............... 382/199 |
| 5,999,651 A | * | 12/1999 | Chang et al. ............... 382/215 |
| 6,011,588 A | * | 1/2000 | Kim ........................... 348/420 |
| RE36,656 E | * | 4/2000 | Califano ..................... 382/199 |
| 6,084,989 A | * | 7/2000 | Eppler ........................ 382/293 |
| 6,097,756 A | * | 8/2000 | Han ............................ 375/240 |
| 6,233,351 B1 | * | 5/2001 | Feeney et al. .............. 382/155 |
| 6,366,927 B1 | * | 4/2002 | Meek et al. ............. 707/104.1 |
| 6,434,279 B1 | * | 8/2002 | Shiba ......................... 382/294 |

OTHER PUBLICATIONS

Panayotis A. Kammenos & Bertram Nickolay, *Vision Systems: Applications*; Proceedings Europt Series; Jun. 13, 1996, Besancon, France: SPIE—The International Society for Optical Engineering, vol. 2786.

Greg I. Chiou & Jenq–Neng Hwang, *A Nueral Network–Based Stochastic Active Contour Model (NNS–SNAKE) for Contour Finding of Distinct Features*; (pg.'s 1407–1416) IEEE Transaction on Image Processing, vol. 4, No. 10, Oct. 1995.

Larry S. Davis, *Understanding Shape; Angles and Sides;* (pg.'s 236–242) IEEE Transactions on Computers, vol. C–26, No. 3, Mar. 1977.

Berthold Klaus Paul Horn, *Robot Vision*; The MIT Electrical Engineering and Computer Science Series; The MIT Press, McGraw–Hill Book Company 1986.

Anil K. Jain, *Fundamentals of Digital Image Processing*; University of California, Davis; Prentice Hall, Englewood Cliffs, NJ 07632 1989.

H. Mori, *Picture Interpretation Language for Silhouette;* Department of Computer Science Yamanashi University, Kofu, Japan; IEEE 1982.

William H. Press, Brian P. Flannery, Saul A. Teukolsky, William T. Vetterling, *Numerical Recipes in C; The Art of Scientific Computing*; Press Syndicate of the University of Cambridge, 1988.

Theodosios Pavlidis, *Algorithms for Graphics and Image Processing*; Computer Science Press, 1982.

Theodosios Pavlidis, *Algorithms for Shape Analysis of Contours and Waveforms*; IEEE Transaction on Pattern Analysis and Machine Intelligence, vol. PAMI–2, No. 4, Jul. 1980.

Bruce Shapiro, Jim Pisa, Jack Sklansky, *Skeleton Generation from x, y Boundary Sequences*; Computer Graphics and Image Processing 15, 136–153 (1981) Academic Press, Inc.

Zbigniew M. Wojcik, *An Approach to the Recognition of Contours and Line–Shaped Objects*; Computer Vision, Graphics, and Image Processing 25, 184–204 (1984) Academic Press, Inc.

\* cited by examiner

BOUNDARY ANALYZER

This application claims the benefit of U.S. Provisional Application No. 60/073,831, filed Feb. 5, 1998, and U.S. Provisional Application entitled "Boundary Analyzer", application Ser. No. 60/118,706, filed Feb. 4, 1999.

FIELD OF THE INVENTION

This invention relates to machine vision, and particularly to methods and apparatuses for analyzing a boundary of an object in an image.

BACKGROUND

The problem of quantitatively describing the shape of an object in an image is central to the field of image processing. Although shape description techniques have been developed for such diverse purposes as character recognition, classification of tactical targets, and assembly line inspection, typically, greater accuracy for inspection of the shape is desired.

In machine-vision systems, operation is broken into two phases: training and inspection. Training, in the case of shape analysis, involves constructing a model of the shape and storing it in memory. Thereafter, during inspection, also known in the industry as runtime, a machine-vision system acquires an image of the object and analyzes the object using the model of the object generated during training. The machine-vision system performs further operations on the image, such as searching for features or deviation analysis.

The accuracy of the results depends upon the model. Noise is common in models that are templates of a good image. When the model contains noise, the results reflect the error in the model caused by the noise.

One result, deviation analysis, typically cannot detect sub-pixel errors, particularly when the analysis uses a subtraction procedure. A subtraction procedure aligns the model and the image, and then combines the two images by subtracting one from another yielding a difference image. The pixel values of the difference image represent differences between the model and the image, such as noise. The difference image is very sensitive to noise, and the noise can be erroneously mistaken for defects, making the procedure identify false errors. To decrease false errors, the effect of noise is minimized somewhat by filtering or morphing the difference image, techniques known in the art. The techniques remove noise or enlarge defects. However, when the goal is to measure the area of the defect as opposed to its presence, these techniques frustrate measurement and make it difficult, if not impossible, to produce accurate sub-pixel error measurement.

There is a clear need for building a more precise model and using the information in inspection, such as sub-pixel error detection.

SUMMARY

The invention provides methods and apparatuses for analyzing a boundary of an object within an image. To analyze the boundary, the method "matches" a representation of the boundary with a representation of a model boundary. In particular, the method "matches" the vertices of the boundary with the vertices of the model boundary. Thereafter, the method measures deviations in the runtime segments whose vertices were "matched" to traintime vertices. The measurement is made using a training class associated with the runtime segments, where the training class becomes associated with the runtime segment during the "matching." Alternatively, the method computes a correlation score indicative of the number of "matches" of runtime vertices to traintime vertices.

Before measuring deviations or computing a correlation score, first the method provides two sets of segments: a first set of traintime segments and a second set of runtime segments. The first set represents the model boundary of the object, such as a boundary during training, and the second set represents the boundary of the object later, such as a boundary during inspection. Each traintime segment and runtime segment has traintime vertices or runtime vertices, respectively, where at least portions of the vertices are approximately the endpoints of the segments. Further, each traintime segment has a training class, such as a line or an arc, for example.

In one embodiment, the accuracy and reliability of the segments and the vertices are enhanced before being "matched." One enhancement is to merge, into a single segment, neighboring segments that are similar, where, in a preferred embodiment, similarity is measured and established using statistical analysis. Another enhancement is to reassign data points of the boundary to neighboring segments whenever a data point "fits better" with its neighboring segment than its initial segment. In one embodiment, "fits better" constitutes minimizing any error between fitting a data point to the initial segment or the neighboring segment. The error is minimized by minimizing a residual error of the fit to the data point between the initial segment and the neighboring segment.

Once the segments and the vertices are provided, the method substantially "matches" at least some of the runtime vertices to at least some of the traintime vertices. In a preferred embodiment, a runtime vertex matches a traintime vertex when the runtime vertex is within a predetermined distance of a traintime vertex. The invention recognizes, among other things, that this process will allow the segmentation of the runtime boundary to be compared usefully to the traintime boundary.

Once matched, a runtime segment becomes associated with the training class of the traintime segment whose traintime vertices most closely matched the runtime vertices of that runtime segment.

The training class is used to measure deviations in the matched runtime segments, where a training class is a line or an arc, for example. An equation of that class is generated of that class that "best fits" the data points of the runtime segment. In one embodiment, the deviation of the data points in the runtime segment from the equation is compared against defect tolerances provided by a user, where a defect can have a height tolerance, duration tolerance, or an area tolerance, for example. The invention recognizes that a parse (which can also be called a segmentation) of a boundary can be trained and used for inspection by exploiting the matching of its vertices.

In further aspects, preferably, the set of runtime segments is refined and rematched a second time to improve the utility of the invention for a variety of boundaries. More particularly, the segmentation of the runtime boundary is altered to allow more runtime segments to match traintime segments.

During the refinement, for each traintime vertex that remained unmatched after the first pass, an additional runtime vertex is provided on the runtime boundary at a position as close as possible to the unmatched traintime vertex. Any runtime vertices that remained unmatched after the first pass are effectively removed, and the segments sharing the unmatched runtime vertex are merged. The refined segmentation of the runtime boundary is then rematched against the initial traintime vertices, as described earlier. Refining the segmentation greatly increases the number of matched vertices. Therefore, more runtime segments can be analyzed for defects. Thus, the performance and repeatability of the method is enhanced.

In further aspects, the representation of the model boundary can be used for other vision processes outside of boundary analysis, both alone or in combination with the matching and refinement of the segmentation steps of a preferred embodiment.

In further aspects, the invention provides an apparatus in accord with the methods described above. The aforementioned and other aspects of the invention are evident in the drawings and in the description that follows.

One advantage of the invention is the invention saves computational time by analyzing a subset of pixels of the image, i.e. that is vertices, for many computational steps.

One of the additional advantages of the invention is the invention can accommodate objects having different lengths or scales.

A further advantage is that the invention can analyze objects at any rotation and it is rotation invariant.

A still further advantage is that the invention can be fully automated, and once an image of a training object is obtained, the invention can automatically provide the results.

In addition to the other advantages, the invention solves some of the deficiencies in the prior art. The model is less influenced by noise, the invention is fast, and it performs sub-pixel error inspection of a variety of objects, among other advantages.

BRIEF DESCRIPTION OF THE DRAWINGS

The invention will be more fully understood from the following detailed description, in conjunction with the accompanying figures, wherein:

FIG. 5B shows an arc that best fits the data points of the runtime segment having a radius $r_0$ graphed against the runtime segment having a radius $r_n$. FIG. 5C is a graph of residuals for each point along the runtime segment versus length, where the residual=$r_n$-$r_0$.

DETAILED DESCRIPTION OF THE DRAWINGS

The methods and apparatuses analyze a boundary of an object or multiple objects within an image. The method is particularly useful for detecting defects in boundaries of a variety of objects. Though this is the form of a preferred embodiment, this embodiment should be considered illustrative, and not restrictive.

Figure 1:
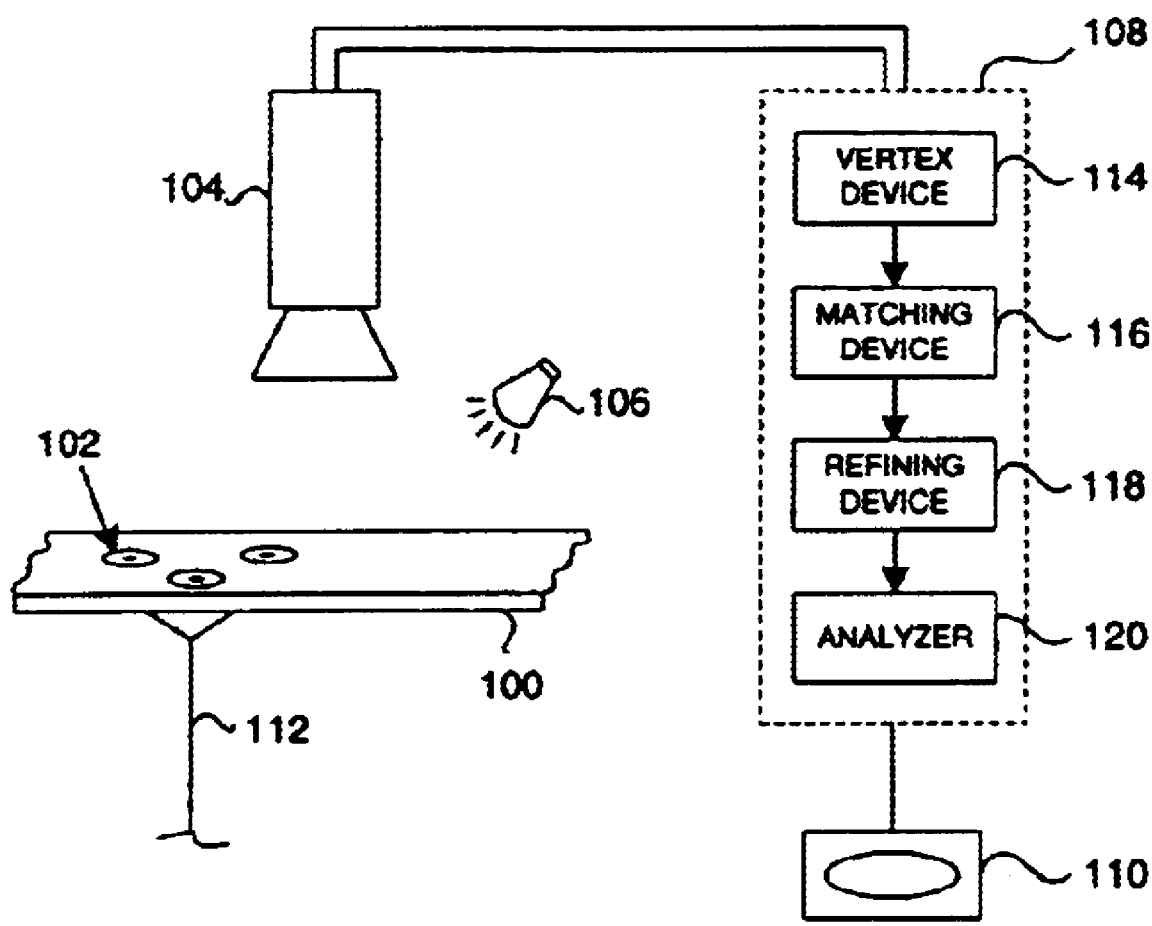
FIG. 1 is a schematic representation of an apparatus of the invention adapted to analyze boundaries of an object.

FIG. 1 shows a typical system incorporating the present invention (not drawn to scale). The system includes: a movable platform 100, such as a conveyor belt for holding and moving objects 102, such as bolts through a factory line, where the objects are often held in position by a vacuum 112; a video camera 104 or other optical sensing device for generating images representing the objects 102 being analyzed, the video camera 104 being typically positioned over or under the conveyor belt to view the objects 102; an illumination device 106 for illuminating the objects 102; an image processor 108, capable of digitizing and analyzing the optically sensed images; and optionally a monitor 110 to display the images or the results of an inspection, for instance.

In a preferred embodiment, the image processor 108 is implemented on a conventional digital data processing system. Those skilled in the art will appreciate that the image processor 108 may be implemented on a special purpose device constructed in accordance with the teachings herein. The image processor 108 includes a vertex device 114, a matching device 116, optionally a refining device 118, and an analyzer 120. These elements of the system analyze a boundary of an object by first matching runtime vertices of an object with traintime vertices of a model object. Once the vertices are matched, defects of the boundary can be found and/or measured for inspection, and/or a correlation score of the object can be generated, as described hereinafter.

In a preferred embodiment, the traintime vertices represent the model boundary of the object during training, and the runtime vertices represent the boundary of the object during inspection.

Before undertaking any inspection of an object, the vision system is trained, as known in the art. Training for this method involves choosing a model by processing a plurality of images using the methods of FIG. 2 hereinafter described, and choosing for the model the image having the least defects (214). Alternatively, training involves using a composite image, where a composite image more accurately represents the variety of images that are typically acquired under production conditions. The composite image can be generated by averaging a variety of registered images, for example. Alternatively, training involves using at least one good image of an object to construct a model boundary of the object. The boundary of the model is parsed into segments, the vertices are identified, and each segment is assigned a training class, discussed with reference to FIG. 8 described hereinafter.

Thereafter during inspection, the machine-vision system acquires an image of the object, and analyzes the boundary of the object using the model boundary of the object generated during training.

Figure 2:
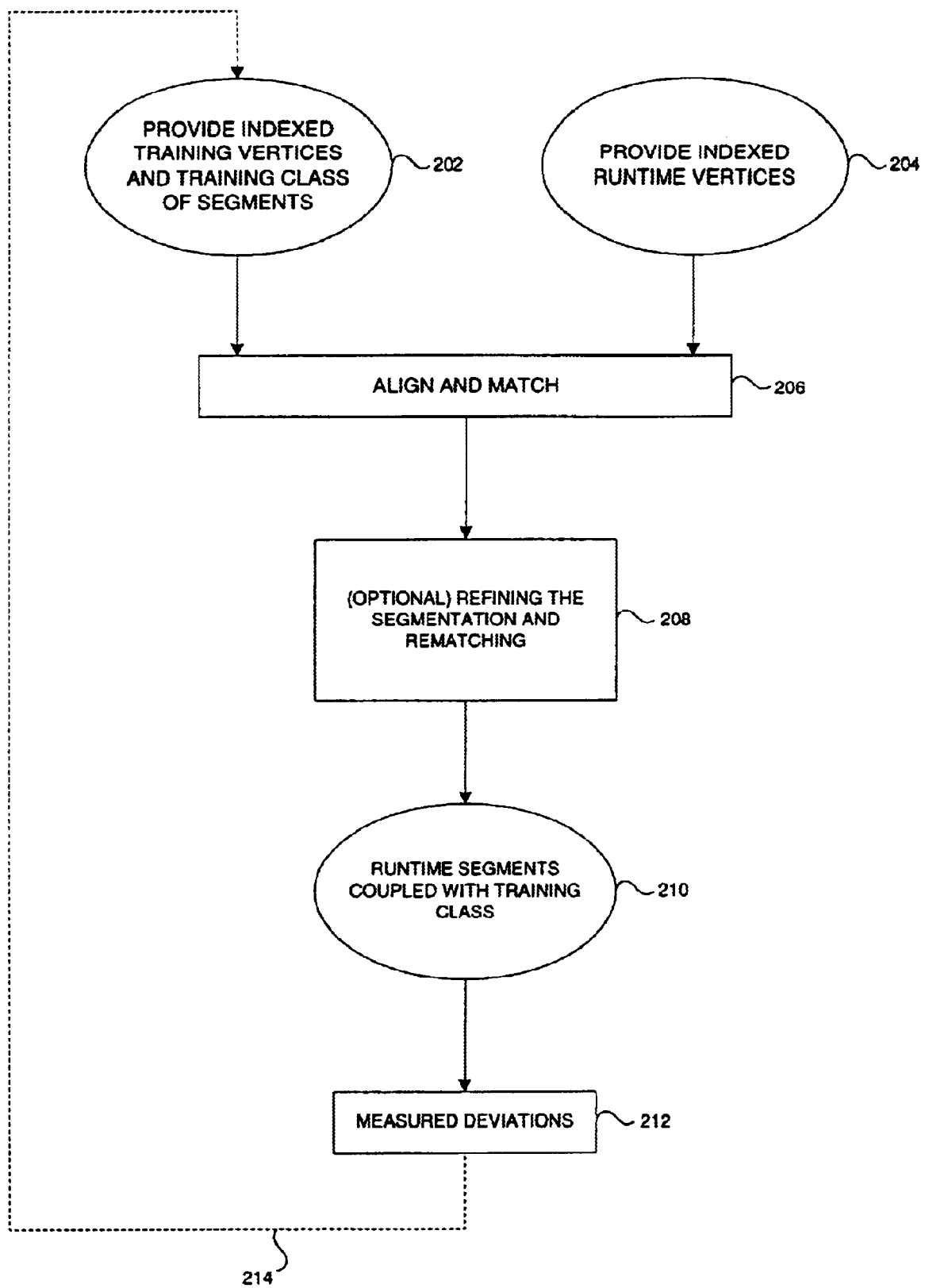
FIG. 2 is a flowchart of one embodiment of the method of the invention.

FIG. 2 is a flowchart of an inspection embodiment of the method of the invention, where the steps of the method will be denoted in the detailed description in parentheses. Inputs into the method include indexed traintime vertices, the traintime segments, and a training class, such as a line or an arc, for each traintime segment, all of which were generated during training (202), as well as indexed runtime vertices and runtime segments for the runtime boundary (204).

Figure 3A:
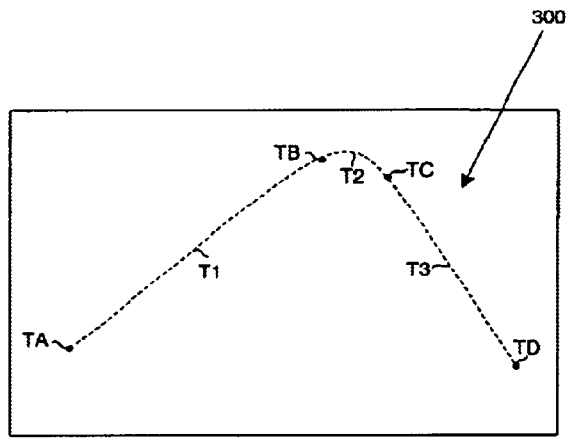
FIGS. 3A–3F are illustrations of a model boundary, a runtime boundary, a model boundary having a fiducial, two instances of the boundaries superimposed on each other, and a runtime boundary after resegmenting generated in accordance with one embodiment of the method of FIG. 2.

Each traintime segment and runtime segment has traintime vertices or runtime vertices, respectively, where at least portions of the vertices are approximately the endpoints of the segments. One set of traintime segments for the model corner illustrated in FIG. 3A are segment T1, followed by segment T2, followed by segment T3. Segment T1 has vertices TA and TB, segment T2 has vertices TB and TC, and segment T3 has vertices TC and TD, where traintime vertices are denoted by a solid circles "•" and all traintime segments and traintime vertices in FIG. 3 are named with a 'T' preceding the identifier, where FIG. 3 is not drawn to scale. Each segment can also have vertices other than endpoints (not shown). Further, each traintime segment has a training class, such as a line or an arc, for example.

Indexing is necessary so that the traintime vertices are compared, in order, to the runtime vertices. The indexing convention can be based upon positioning of the vertices in clockwise order or counterclockwise order, from left to right in a raster, or a less formal sequence, for instance. The indexing convention must be consistent between the traintime vertices and the runtime vertices. In a preferred embodiment, connected (also known as chained) segments have their vertices indexed either in clockwise or counterclockwise order before the vertices of the next set of connected segments are indexed.

Chained boundary pixels are output from several known machine-vision tools. The tools typically uniquely order the output boundary pixels. The method described herein can index the vertices using the ordering of the known vision tools and automatically analyze a boundary.

For each traintime segment, such as segment T1, T2, and T3, a data structure is to constructed during training that includes a unique identifier for the vertices (also known as an index), the x and y information of the vertices, and any other characteristics of the vertices or the segment, such as class. Those skilled in the art will realize that each data structure could also contain, for example, the radius of curvature of the segment and the number of vertices, among other parameters, to represent each segment.

Further, those skilled in the art will realize that another way to index the vertices is to index the segments and mark the order for examining the head or tail vertices of each segment. Such a scheme, or any variation thereof, can be used to index the vertices, instead of uniquely identifying all the vertices from one another with one index.

The runtime segments are similarly created and stored, but do not require the class information.

Figure 3D:
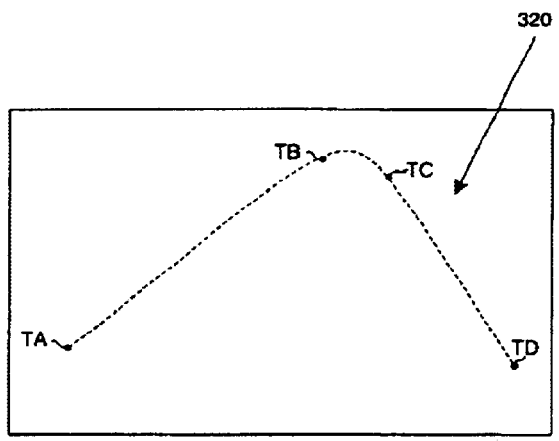
Figure 3B:
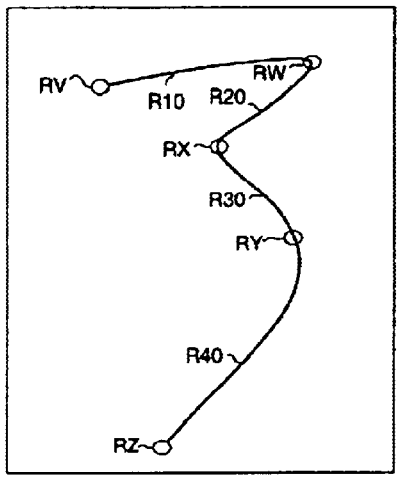

FIG. 3B illustrates a runtime boundary parsed into segments R10, R20, R30, and R40, with vertices RV, RW, RX, RY, and RZ, where runtime vertices are denoted by open circles "○" and all initial runtime segments and runtime vertices in FIG. 3 are named with an 'R' preceding the identifier.

After providing and segmenting the data points of the boundary for both training and inspection, the next step is to substantially align and match the traintime vertices to the runtime vertices (206). Alignment shall be defined as orienting a first object with respect to a second object, such as planar position or angular orientation, substantially equal to the corresponding alignment parameter of the second object. After alignment, the traintime vertices, TA, TB, TC, and TD, are then compared and matched where possible with the runtime vertices, RV, RW, RX, RY, and RZ.

Figure 3E:
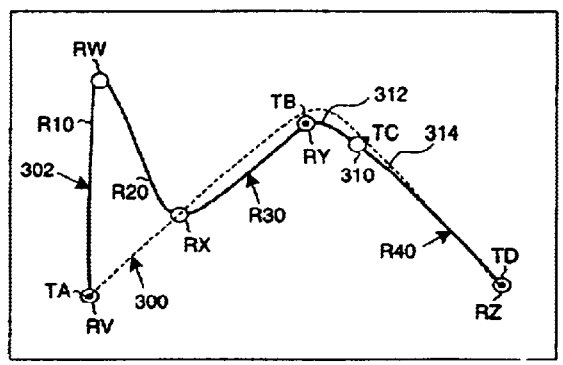
Figure 3C:
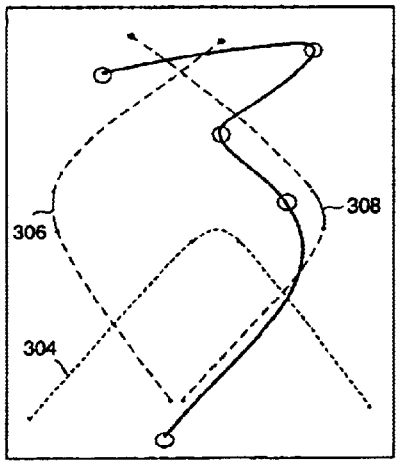

If the traintime vertices were not aligned with the runtime vertices, the right side of an object boundary could be matched with the left, or the top with the bottom. Illustrations of several mismatched orientations are shown in FIG. 3C, where the traintime vertices are shown superimposed over the runtime vertices.

In a preferred embodiment, the traintime vertices are rotated, translated and scaled (i.e., substantially aligned in three dimensions) relative to the runtime vertices to minimize error when matching the runtime vertices. An illustration of the traintime boundary 300 aligned with the runtime boundary 302 is shown in FIG. 3E, where traintime vertices are denoted by solid circles, "●" and runtime vertices are denoted by open circles, "○".

Successive matching will yield the proper rotation, origin position, and scale of the object. In this implementation, the traintime vertices are matched to the runtime vertices of the object at several discrete angles, such as position 304, 306, and 308. The rotation, origin position, and scale yielding the most matched vertices are the rotation, origin position, and scale of the object. Instead of searching for one object at a time, alternatively, vertices for all objects in the image are searched simultaneously. A perhaps prohibitively time consuming search becomes much quicker because the search is just for vertices and not for all the data points of each of the objects.

Alternatively, an orienting feature, such as a fiducial 320 shown in FIG. 3D or other reference site, which is trained during training, provides information indicating the presence of the object. The orienting feature should be a distinct part of the image to enhance repeatability, as known in the art and further described in commonly assigned, co-pending patent application entitled "A Method for Automatic Visual Identification of a Reference Site in an Image", application Ser. No. 09/129,152, filed Aug. 5, 1998, assigned to Cognex Corporation.

During runtime, the method searches for the orienting feature. Searching in this illustrative, embodiment is effected using vision tools with searching capabilities, such as SEARCH TOOL, an application of normalized-correlation search sold by Cognex Corporation, which runs on the vision system.

Even without an orienting feature, the method can use a search tool that can handle rotation and/or translation and/or scale. For instance, a coarse search can be made by a connectivity tool, such as the BLOB TOOL, an application of connectivity analysis sold by Cognex Corporation. The BLOB TOOL can find the principle moment of inertia, and therefore indicate rotation. The coarse search is combined with a refined search on a smaller area. The refined search is performed by search tools known in the art, or the PATMAX TOOL, a search tool sold by Cognex Corporation, or the CALIPER TOOL, an application of an edge detection tool sold by Cognex Corporation. The refined search refines the orientation, and when necessary, any translation and scale information.

Additional search methods known in the art also do not require a fiducial, such as performing two one-dimensional registrations. Registration on the model and object images shall be defined as orienting the model with respect to the object so as to make all alignment parameters of the model substantially equal to the corresponding alignment parameters of the object. Registration is performed, in the x and y directions, on projections, as known in the art, of the model and object images. Registration compensates for any differences in the coordinate systems of the model and the object image, including differences in origin position, scale, and rotation. The registration can alternatively be effected by vision tools known in the art, such as described in U.S. Pat. No. 5,548,326 entitled "Efficient Image Registration", assigned to Cognex Corporation, which is incorporated herein by reference.

Once the vertices are aligned in at least one dimension, the vertices are examined to see if they match one another. In a preferred embodiment, a runtime vertex matches a traintime vertex when the runtime vertex is within a predetermined distance of a traintime vertex. The predetermined distance depends on the application and can be adjusted by the user, a typical value could be several pixels. In FIG. 3E, traintime vertex TA matches with runtime vertex RV, traintime vertex TB matches with runtime vertex RY, and traintime vertex TD matches with runtime vertex RZ, where a match is indicated by a "⊙". Each matched pair of vertices is stored in a data structure along with the training class of the traintime segment that is represented by the traintime vertices. Alternatively, as will be evident to those in the art, the training class is coupled to the runtime vertices by a link to the traintime data structure. The segments not having both runtime vertices matched, such the segments containing as RW and RX, are not measured (212) unless the segmentation is refined and the vertices rematched (208), as hereinafter described.

Figure 4A:
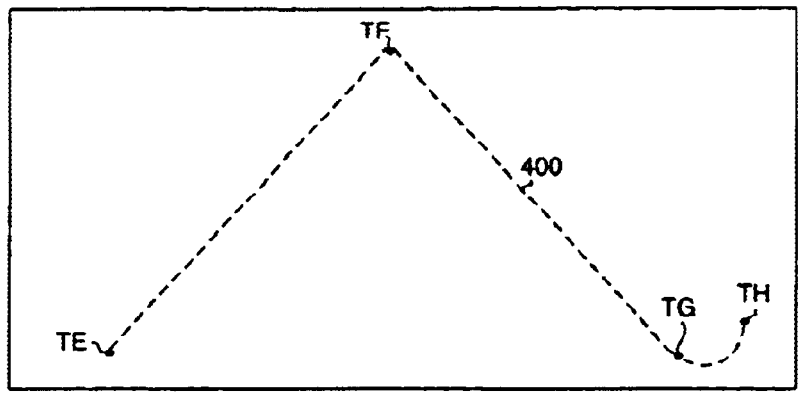
FIGS. 4A–4C are illustrations of a model boundary, a runtime boundary, and the boundaries superimposed on each other without refining the segmentation, which are generated in accordance with another embodiment of the method of FIG. 2.
Figure 4B:
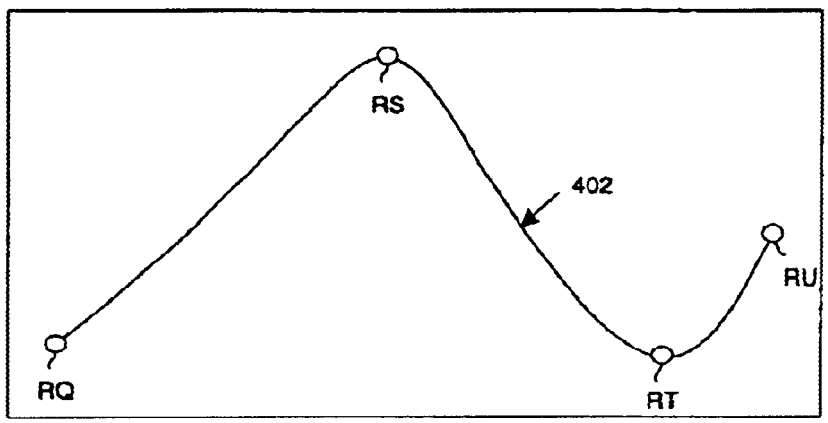
Figure 4C:
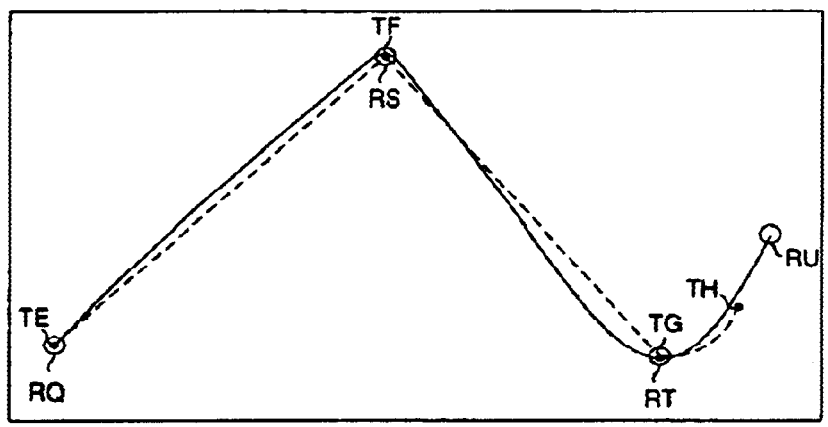

Vertices can also be considered matching when a traintime vertex and a runtime vertex are similarly indexed, where similarly indexed means to match sequentially along a connected boundary or sequentially in their indexing schemes, for example. In FIGS. 4A–4C (not drawn to scale), every traintime vertex TE, TF, TG, and TH of a model boundary 400 is similarly indexed, and, therefore, matches, respectively, with every runtime vertex RQ, RS, RT, and RU of a runtime boundary 402, even though vertex RU is not within a predetermined distance of the traintime vertex TH. The vertices of FIGS. 4A–4C match both sequentially along connected segments, as well as sequentially in their respective indexing schemes. For many applications, this variation of matching is inadequate. However, it is more useful in inspections that do not compensate for scalar changes and for correlation scoring, as discussed hereinafter with reference to FIG. 6.

The applicability and usefulness of the method for a variety of boundaries is enhanced by optionally refining the segmentation and rematching the segments (208). The refining the segmentation and rematching segments (also called herein resegmenting and rematching) examines runtime segments that were not matched to one traintime segment, and splits or merges the runtime segments so that the runtime vertices match better with the traintime vertices. Ideally, but not necessarily, the output of the refining step (208) is a 1:1 correspondence between runtime segments and traintime segments, and each runtime segment is associated with a training class. In other words, each runtime vertex is matched to one traintime vertex.

During refining (208), a runtime segment is split into two segments when its vertices match opposing ends of two neighboring traintime segments. For example, segment R40 and its vertices RY and RZ of FIG. 3B do not have a one-to-one correspondence with a single traintime segment and its vertices, as shown in FIG. 3E. In contrast, as shown in FIG. 3E, vertex RY matches vertex TB of segment T2 and vertex RZ matches vertex TD of segment T3, where segment T2 and segment T3 are neighboring segments. The common vertex TC of both segment T2 and segment T3 has no match in the runtime boundary because vertex TC was outside the predetermined distance of any runtime vertex from the initial segmentation (202) and (204).

Vertex TC is given a match by splitting the runtime segment R40 to create an additional runtime vertex 310 designated by a broken open circle,

Figure 3F:
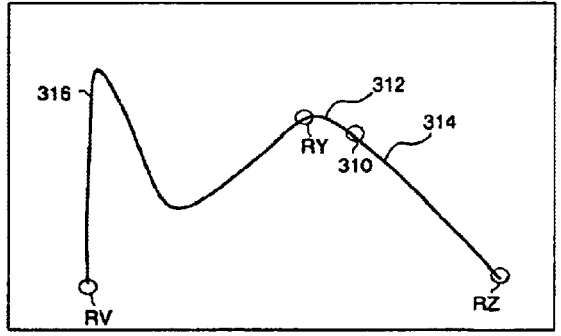

The additional runtime vertex 310 is positioned as close as possible to the position of the traintime vertex, TC, while remaining on the runtime boundary; no adjusting of the runtime boundary positions is permitted. Thereafter, two runtime segments, segment 312 and 314, exist in place of segment R40 as illustrated in FIGS. 3E and 3F.

During refining, typically runtime segments with unmatched vertices are merged. Consecutive segments, each having at least one unmatched vertices, are merged together to form one larger runtime segment. For example, segment R10, R20 and R30 are merged into one segment 316 as illustrated in FIGS. 3E and 3F, where segment 316 has vertices that match the traintime vertices being TA and TB. The refining of the segmentation is not necessary for matching FIGS. 4A and 4B.

The resegmented runtime boundary is then matched to the traintime boundary, as described earlier. The matched segments, their vertices, and class are assigned to a data structure, as described earlier. It should be evident that to decrease processing only the revised runtime segments and the unmatched traintime segments need to be reexamined for matching.

Ideally, the output of the refining and rematching step (208) is a 1:1 correspondence between traintime and runtime segments, where each runtime segment is coupled with a training class (210).

The training class is used to measure deviation (212).

If only some of the runtime segments were matched, only that portion of the runtime segments is measured.

A preferred method for measuring deviation is to measure the offset of each data point from a "best-fit" equation for that segment. An equation is generated of the same class associated with the segment that "best fits" the data points of the runtime segment. Only a subset of the data points are required to generate the "best fit" equation, such as a clustering or data points near the vertices or every third point, for example. When the class is a line, the equation can be generated using least-squares linear regression or other methods known in the art. When the equation is an arc or other primitive, the equation can be generated using least-squares polynomial regression or other methods known in the art. An equation generated using these methods is what constitutes "best-fit," also as known in the art. Any data point offset from the best-fit equation is an error. The deviation of the runtime segment from the best-fit equation, if any, is used to pass or fail a segment. Predetermined (user defined) limits on errors and deviations are used to pass or fail the object on an assembly line.

Figure 5A:
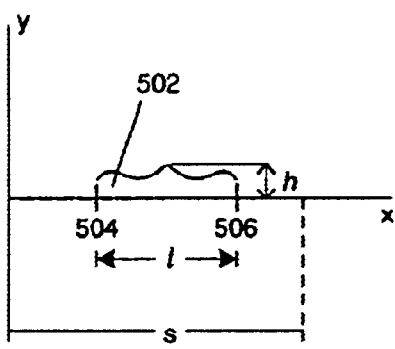
FIG. 5A is an illustration of a runtime segment having a defect. The runtime segment is aligned with the x-axis for measuring in accordance with the method of FIG. 2.

FIG. 5A depicts a rotated runtime segment and a best-fit line that somewhat aligns with the x-axis (not drawn to scale). The best-fit line has a length, s, along the x-axis and the area 502 above the line is a deviation. The deviation has a length, l, which can also be called duration, and a height, h. Each application dictates the acceptable duration and/or height of a defect, such as deviations having negative heights of less than 6 microns are acceptable, for example. Alternatively, the area of the defect is the criteria. The area 502 of defect is the result of the integral of the runtime data points from point 504 at the start of the defect to point 506 at the end of the defect, calibrated appropriately between pixels and area units.

Figure 5B:
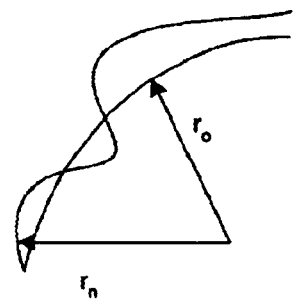
FIGS. 5B–5C are illustrations of one embodiment of a method for measuring defects.
Figure 5C:
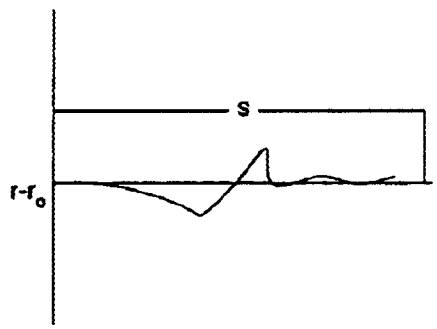

FIG. 5C depicts an arc of a best-fit circle, having a radius $r_0$ and an arc of a circle of the runtime segment having a radius, $r_n$ (not drawn to scale). Error for data point n is determined by subtracting $r_0$ from $r_n$, where error=$r_n$-$r_0$ is called residual error. The error for each data point along the length of the curve is similarly calculated and all the errors are expressed as a residual plot, as shown in FIG. 5C, as the residual=$r_n$-$r_0$ versus length of the curve, s (not drawn to scale). A different r needs to be calculated for each point along the runtime segment. Any point that lies above or below the x-axis is an error.

Further, in a preferred embodiment, all arcs are treated as approximately circular arcs that can be fit by a circle.

The runtime segment can be rotated and translated using a known technique wherein each variable is represented in terms of the trigonometric functions sine and cosine. A rotation using this method requires at least four multiplies and two additions.

In a preferred embodiment, computational time is reduced by rotating the runtime segment without multiplication. Particularly, a segment having endpoints (x, y) and ($x_n$, $y_n$) is rotated and translating such that (x, y) becomes (0, 0) and ($x_n$, $y_n$) becomes (s, 0) so that the endpoints of the segment align with the x-axis. The amount of rotation and translation is determined for point (x, y) by the solving for $\Delta x$, $\Delta y$ in the equations: $x+\Delta x=0$ and $y+\Delta y=0$. The amount of rotation and translation is determined for the other endpoint ($x_n$, $y_n$) by solving for $\Delta y_n$, $\Delta x_n$ in the equations $x_n+\Delta x_n=0$ and $y_n+\Delta y_n=$ s. For each data point between the endpoints (x, y) and ($x_n$, $y_n$), the data point is translated and rotated by adding (n−1)*increment to $\Delta x$, where the increment is given by $$increment = \frac{x - x_n}{n} \text{ for } n = 1 \text{ to } n.$$

Near n, the value of the data point approaches $x_n$, and the value of $\Delta x$ approaches $\Delta x_n$ because of the linearly increasing amount (n−1)*increment added to $\Delta x$.

For example, a segment having endpoints (x=−100, y=100) and ($x_n$=−50, $y_n$=200), where n=100 data points, $\Delta x = -x = -(-100) = 100$; and $\Delta x = -x_n = -(-50) = 50$; and $$increment = \frac{x - x_n}{n} = \frac{-100 - -50}{100} = -.5.$$

At n=2, $x_2$ is translated and rotated by adding (n−1) *increment to $\Delta x$, rewritten as $\Delta x_2$=(n−1)*increment+$\Delta x$= (2−1)*−0.5+100=99.5.

This is repeated for each x.

At $x_{n-1}$, $\Delta x_{n-1}$=(n−1−1)*increment+$\Delta x$=(100−1−1)*− 0.5+100=50.5.

Finally, for $x_n$, $\Delta x_n$=50. The same process is repeated for y and can be applied to all segments measured.

If other classes are used, an ideal representation of the other classes can also be plotted against the runtime segment using these principals to yield defect measurements, where the classes are modeled by equations other than arcs.

Calculations other than the error calculation described above can be used, such as least-squares regression error, for example.

Defects as small as 1.5 pixels in area have been found using the methods of FIG. 2, where a defect can have almost any fractional height and duration that equals 1.5 pixels in area.

The longer the segment, the more accurate the defect detection because more data points increase the reliability of the classification of the segment during training, and the determination of a best-fit equation during inspection.

In one embodiment, before error is calculated, the length of each runtime segment is adjusted to substantially match the length of the matched traintime segment. New data points along the runtime segment are interpolated from the runtime data points to match the frequency of the traintime data points, and the calculations hereinbefore described are performed on the interpolated data points. Methods other than each data points offset from a best-fit equation can be used to measure deviation, such a measure of spread of a plurality of data pixels around the line or arc, for example.

A infrequent deviation is missed unless a test of curvature is included. The error arises when a traintime boundary consisting of a line, followed by an arc, followed by a line becomes a runtime parse of three lines. The second line of the runtime parse should be an arc. When the second line is measured for deviations using the training class of an arc. The line is modeled having an infinite radius, where r=$r_0$=∞. Therefore, there is a zero residual, and the defect would remain undetected without any curvature test. The error is corrected by keeping the curvatures of the traintime segments that are arcs and comparing the traintime curvature to the runtime curvature, where curvature is calculated during training as described hereinafter with reference to FIG. 8. Alternatively, any runtime segment having an infinite radius of curvature can be failed.

Similarly to the above example, both matching and/or defect detection and/or correlation analysis described hereinafter, can be made more specific for each application by comparing other parameters, such as runtime class with training class; or curvature of segments, where the parameters are values previously calculated or new values.

For instance, the successive matching can be further refined to also match class of segments and/or match curvature of segments.

For instance, using curvature, the measurement algorithm could pass or fail a segment depending on whether the segment was within an acceptable range of curvature.

Further, changes in curvature from positive to negative can be used to matched and/or measure segments, such as detecting S curves that have the same local tangent at each end, or to match segments and/or use to fail concave vs. convex corners, for example. In the image processing, changes in curvature are typically not calculated by taking the derivative of curvature because noise effects the calculation. Instead, changes in curvature can be calculated using long segments, for instance.

Depending on the application, the measurement and matching procedure can have ever-increasing specificity, and the exact nature of additional variables will depend on the application.

Figure 6:
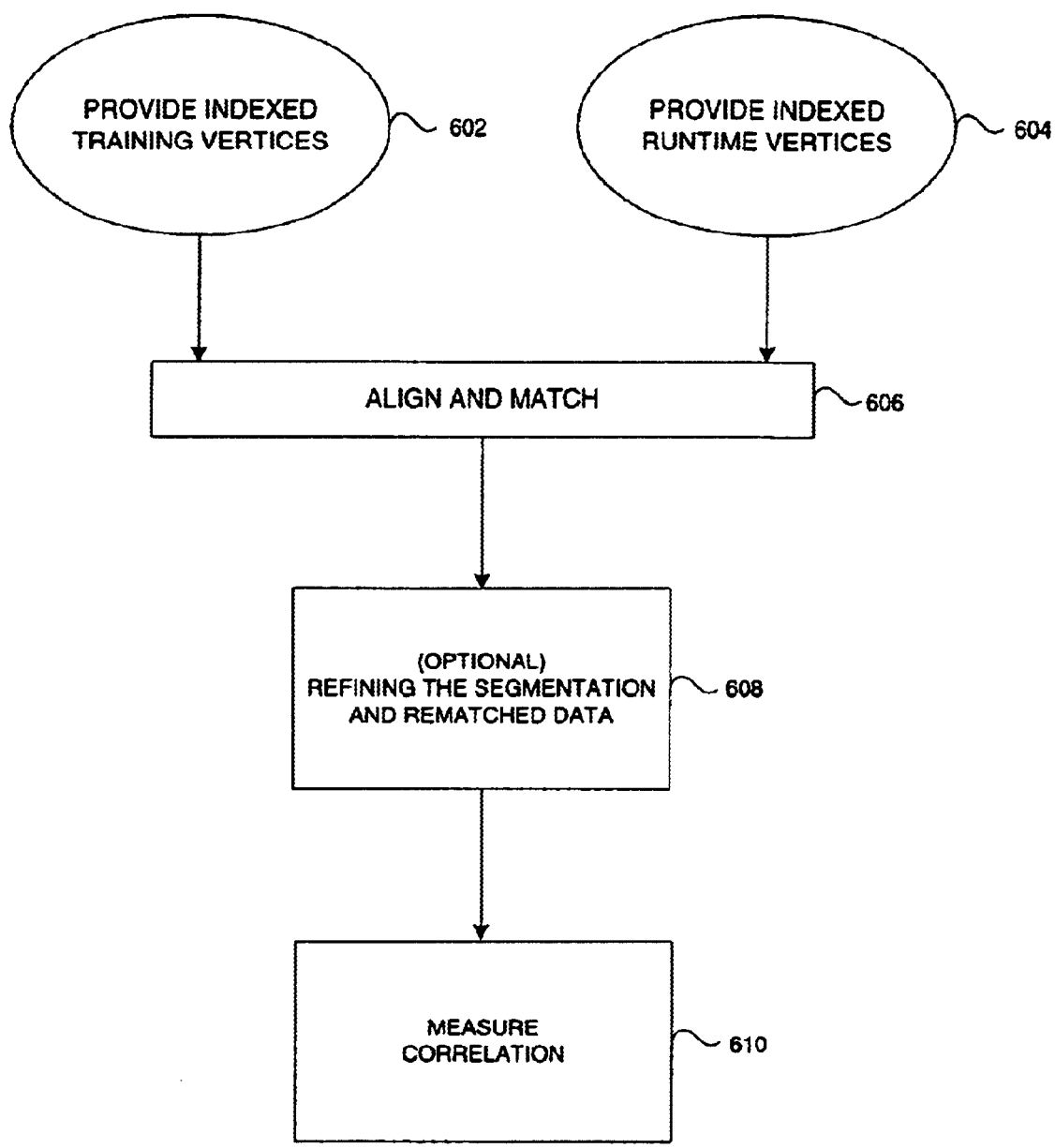
FIG. 6 is a flowchart of another embodiment of the method of the invention.

FIG. 6 shows another embodiment of the invention that quickly generates correlation scores for runtime objects, where steps of the method will be denoted in the detailed description in parentheses.

As is known in the art, an image of an object can be searched for a match to a template that has been stored in memory. When a match is located, a correlation or "shape score" can be calculated, which is a measure of how closely the template matches the located object. As known in the art, template matching by correlation compares each pixel of the object to the template to determine if there is a match. Typically, if the object is identical to the template, the correlation score, $c^2$, produced is 1.0. Any deviations in the object are expressed in the score as a fraction of 1, where the closer to 0 the score is, the more the object differs from the template.

FIG. 6 illustrates a method for finding a shape score by searching the input image for vertices. Specifically, the runtime and traintime boundaries are segmented and indexed (602) and (604). Unlike the previous embodiment, however, whether the class is determined is optional. Thereafter, instead of comparing all the pixels of the model object (i.e., the template) to the runtime image (i.e., the input image) as in correlation heretofore described, only the vertices are compared through matching (606), where matching is accomplished as previously described. The degree of matching of the vertices is the correlation score (610). The score can be normalized to also be on a scale from 0 to 1 if desired.

Again, it is optional to refine the segmentation of the unmatched segments and rematch their vertices (608). When resegmenting is not performed, a wider range of correlation scores should be accepted to indicate a good part.

Figure 7:
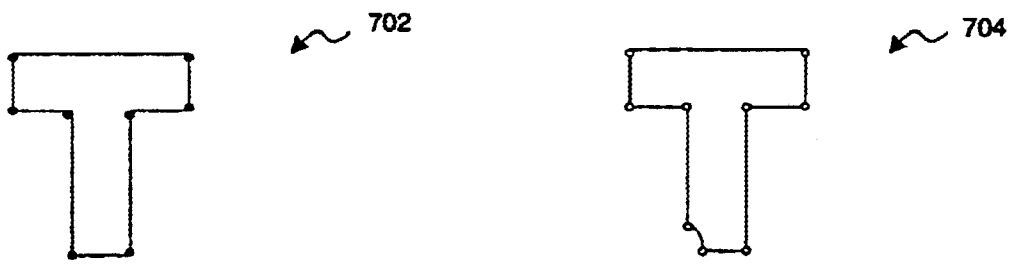
FIG. 7 is an illustration of a runtime object having vertices which can be correlated against an illustrated traintime object also having vertices.

An example can be illustrated using the template 702 and the input image 704, shown in FIG. 7. The template has eight vertices and eight segments. The input image is missing a corner, and instead has nine vertices and nine segments. Seven runtime vertices match to traintime vertices, leaving one unmatched traintime vertices, and two-unmatched traintime segments. The score can reflect the missing vertices, the missing segments, the number of extra segments, or the number of extra vertices. For example, missing two out of eight segments from the runtime object is a correlation score of 0.75.

It will be evident to those skilled in the art that more than one object can be examined within each field of view of the imaging device. Each object can have the same training model with varying rotation or each object can have its own model as in the case of analyzing each letter of a word. Alternatively, other variations of boundaries, such as a sequence of unconnected boundaries, can be analyzed using one or more training models. When more than one object is examined within a field of view, each object's boundary must be properly aligned with the model boundary, which can be accomplished using the methods described herein before.

Any number of deviations related to a boundary can be detected and measured using these methods, including, for example, nicks and scratches at the boundary, mouse bites in boundaries, excess material, and protrusions.

In addition, if more information was stored with each segment, skew of the segment or other geometrical aspects of each segment could also be measured.

Further, using these methods, recognition of, and defect detection in, lettering can be conducted independent of stroke width, where the requirements of stroke width are well known in the art.

Before defect detection, the boundaries are trained. During training a list of boundary pixels is generated that is thereafter calibrated into data points, segmented and classified. It should be appreciated that vision tools with training capabilities known in the art or known combinations thereof can generate a list of boundary pixels suitable for use with the invention. For example, a tool executing a connectivity analysis, BLOB TOOL, PATMAX TOOL, a CAD tool, or other machinery that requires or acquires and has information relating to the characteristics of interest. These tools can be used alone or combined with and tools having boundary pixel capabilities, particularly ones that look for a curvature edge, such as Sobel followed by peak detection, BOUNDARY TRACKER TOOL, an application of contour following sold by Cognex Corporation or PATMAX TOOL, for example. Alternatively, training information can be manually obtained by an operator and entered into the system. A boundary tracker that only processes pixels at or near the boundary is preferred because it saves time over tools that touch the entire object. In a preferred embodiment, the tool chosen should discern a list of boundary pixels that have sub-pixel specificity, so that the boundary is smooth.

Figure 8:
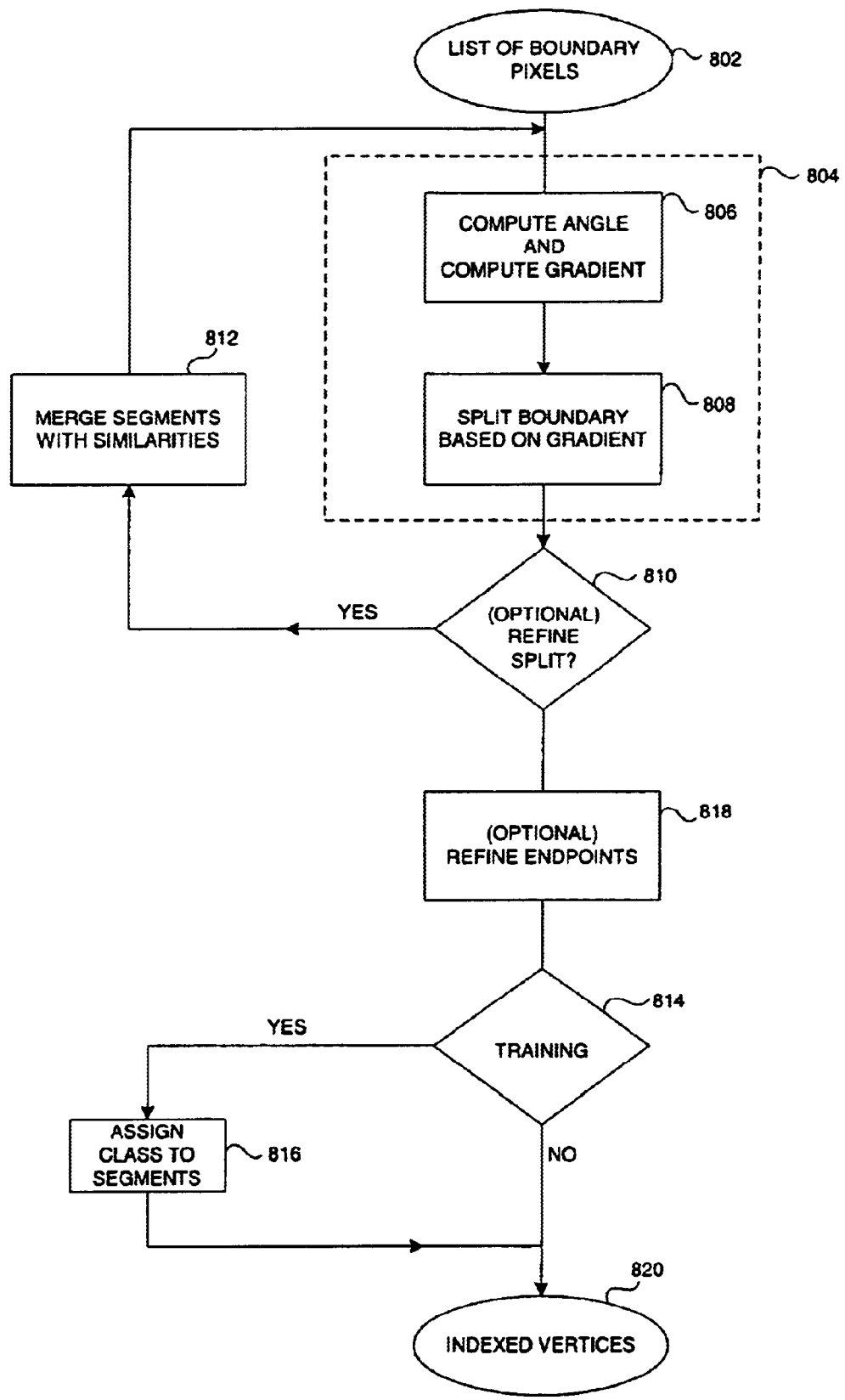
FIG. 8 is a flow chart of methods to provide indexed vertices for the model object and the runtime object.

Generating the indexed traintime and runtime vertices is illustrated by the flow chart of FIG. 8, where steps of the embodiment are denoted in the detailed description in parentheses. Once the boundary pixel list is provided (802), the boundary has to be calibrated into data points and parsed into segments (804) to generate a set of indexed vertices (820). It is possible to proceed in a number of ways to parse a boundary (804), such as with B-splines and approximations as known in the art, an illustration of which is described in *Algorithms for Graphics and Image Processing*, Theo Pavlidis, Computer Science Press 1982.

In a preferred embodiment, the boundary is spilt into segments when the curvature of the boundary changes by more than a predetermined threshold (808). Curvature is approximately the derivative of the angle of the local tangent. The angle of the local tangent is given by $$\theta = \tan^{-1}\frac{\Delta y}{\Delta x},$$

where the values of x and y are properly calibrated and interpolated, if necessary, from the list of boundary pixels. Each angle is calculated using non-successive data points to minimize noise. The distance to the data points from one another should be large when compared with the spatial noise frequency. As known in the art, there are many variations to this technique. Alternatively, the angles can be computed without using successive data points and the data smoothed, using filters as known in the art, before finding the curvature. It should be apparent that there are other ways of accomplishing the measurement by methods known in the art.

Figure 9:
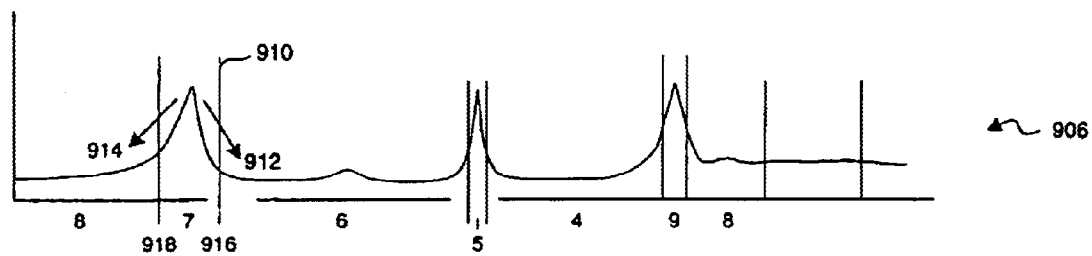
FIG. 9 is an illustration of an object, a plot of the angle of the local tangent of the object along its length, and the derivative of the angle of the local tangent along its length in accordance with the method of FIG. 8.
Figure 9:
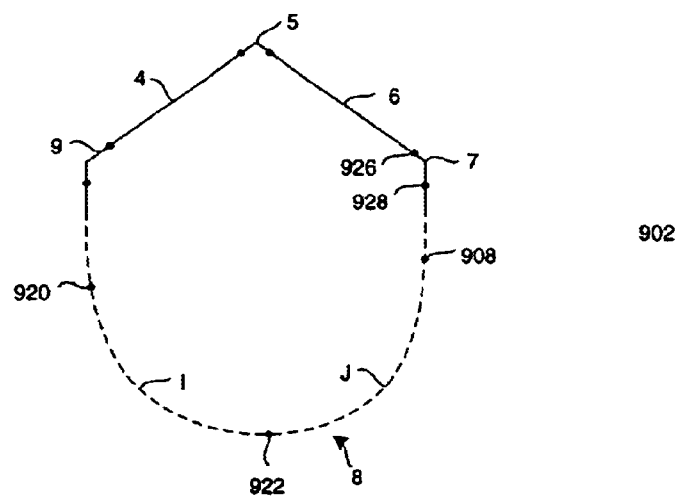
Figure 9:
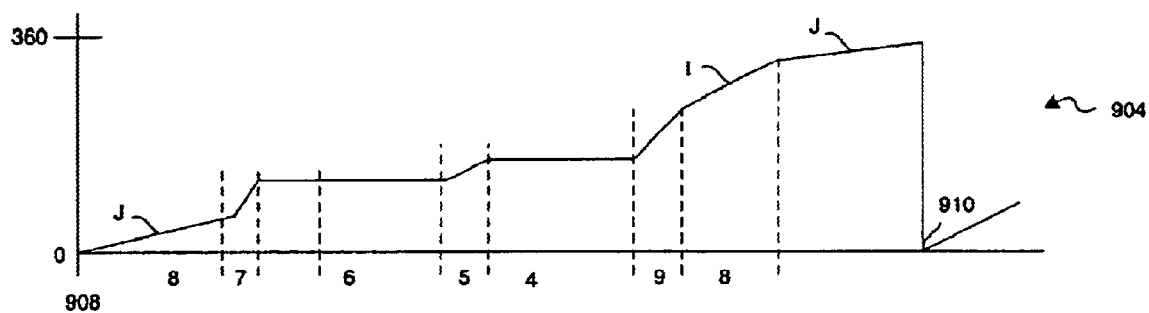

An object 902, a plot of the angle of the local tangent 904 (not drawn to scale), and a plot of the curvature 906 (not drawn to scale) is illustrated in FIG. 9, where the x-axis begins at point 908 and continues counter-clockwise around the object from segment J to segment 7, 6, 5, 4, 9, I, and back to segment J.

The angle discontinuity at 910 corresponds with the angle changing from 360° back to 0°, such as in a circle. A change from 360° back to 0° is a smooth transition. The curvature of the transition, however, will appear as an abrupt change unless the discontinuity is removed or avoided.

The discontinuity can be removed or avoided using several methods. In one embodiment, a phase-unwrapping algorithm removes the discontinuity. The algorithm checks each transition between a first angle and a second angle. The algorithm adds or subtracts 360° to the second angle whenever the transition is greater than 180°. It should be apparent that there are other ways of accomplishing the unwrapping, such as using a look-up table as known in the art.

The boundary is segmented by locating the local maximums in the curvature and walking both sides of the local maximum until a threshold curvature change on each side of the maximum has been met. The positions where the threshold has been met are the vertices of that segment. For example, for a local maximum 910 the curvature change in both the directions 912 and 914 is examined. The position 916 where the curvature difference from 910 reaches the threshold is a vertex of the boundary, where the position 916 corresponds to vertex 926 of the object 902. Similarly, the position 918 corresponds to vertex 928.

In a preferred embodiment, the threshold value is chosen so that the boundary is segmented into many more segments than could appropriately represent the boundary. For instance, object 902 could typically be segmented into 3 times as many segments as shown. Choosing the threshold value with this principle allows each segment to be represented by a line or a circular arc after being optionally merged (812), and then optionally refining the data points at or near the endpoints (818), as described hereinafter. Consequently, the curvature of each segment parsed using the preferred threshold is generally flat, whether the segment is a line or an arc, because the change is somewhat constant over the length of the segment; it is within the threshold. In plot 906, the y-distance from each segment to the x-axis is the curvature of the segment. For example, a line, represented by segments 6 and 4, has approximately a zero curvature. Negative curvature, although not shown, is also possible. For illustration purposes, plot 906 has a smaller degree of parsing than would be found with a preferred threshold.

The magnitude of the threshold dictates, in part, the degree of parsing of the boundaries. A higher threshold will allow smaller curvature changes before parsing into segments than a lower threshold, where a higher threshold has a higher numerical value. For example, a higher threshold will parse a curve into three segments as compared to two segments produced by a lower threshold. The threshold can be a numerical value or a percentage threshold.

The choice of a percentage threshold or a numerical value threshold also dictates, in part, the degree of parsing. Typically, a percentage threshold produces more segments than a numerical value threshold. If the numerical value threshold is too high or too low, fewer segments will be generated. However, the percentage threshold consistently segments the boundary.

The preferably low threshold, while identifying most of the vertices, allows a great deal of noise. Although the initial parse and its indexing can be input into the match, in a preferred embodiment additional noise is minimized by refining the split (810) through merging (812) and refining the segments (818).

Similar neighboring segments are merged, where similar can be tied to geometric factors, such as having an angle within a predetermined range or having a predetermined ratio of the length of the common boundary to the total length of the boundary of two segments, for example. Merging based on other characteristics, such as grey-level, is also known in the art.

A more sophisticated test for merging employs estimates of average curvature and standard deviation of the curvature for each segment. When the means of two connected segments are close enough then the two segments are merged, which is determined using a statistical t-test for determining significantly different means, where the t-test is known in the art and further described in *Numerical Recipes in C, Chapter 13—Statistical Description of Data, Section 4—Do Two Distributions have the Same Means or Variances*, Press et al. 1988, pp. 481–483, incorporated herein by reference. The t-test calculates the number of standard errors between the means of the two segment distributions by using a pooled variance formula. With the standard error, t is computed and the significance of t determined by using a distribution probability function that gives the probability that a certain statistic would be smaller than the observed value if the means were in fact the same. The segments are merged when the statistics substantiate the hypotheses that the two means are from the same distribution.

In a preferred embodiment, some assumptions are used to simplify the calculation. It is assumed that the standard deviations of two adjacent segments are similar for computing the standard error because the standard deviation is related to the tool used to generate the list of boundary pixels and is constant for all segments. Therefore, computing the standard deviation of each segment is unnecessary. The resulting t is proportional to the standard t-test, and compared not against the distribution probability function but against the t of the adjacent segment. If the difference between the ts of adjacent segments do not exceed a threshold then the segments are merged. The threshold is determined based on what is statistically significant for the application. In one embodiment, the threshold is 30, although other numbers can be used as should be evident in the art and as required by each application, where the t value is given by:

$$t \alpha \frac{\overline{curvature_c} - \overline{curvature_p}}{\sqrt{\frac{1}{n_c} + \frac{1}{n_p}}}$$

where $curvature_c$ is the average curvature of the current segment, $n_c$ is the number of data points in the current segment, $curvature_p$ is the average curvature of the previous segment, and $n_p$ is the number of data points in the previous segment.

For example, segment I and segment J of object 902 will merge into one segment, segment 8.

Merging is a monotonic operation that will eventually stop.

After merging, preferably the positions of the endpoints of the segments are refined (818) more precisely than given by the curvature transitions. First, the endpoints of adjacent segments are tested to see which segment "fits" better. For example, if pixel(s) at the end of segment 4 "fit" segment 9 better, the pixel(s) are re-assigned to segment 9 and removed from segment 4. This process continues until either no more pixels change alliances or until a predetermined number of pixels are examined. Typically, no more than a few pixels are ever re-assigned from one segment to another.

"Fit" is determined using the process described with reference to FIGS. 5A–5C. Each pixel is assigned to the segment that minimizes the equation: $|r-r_0|$, where $r_0$=the radius of the best-fit circle for that segment and r=the radius using that data point. Alternatively, fit is determined using a least-squares regression error for adjacent segments.

This technique can be modified to accommodate other functions.

Refinement of the endpoints of the segments is optional (818) and either the initial parse (804) or the merged parse (812) can be input the refinement (818). Refinement of the endpoints adds to the repeatability of the invention and enhances the ability of the invention to detect smaller defects.

Although the processing of the runtime segments is complete after the refinement of the vertices, the traintime segments still need to be assigned a class (816). In a preferred embodiment, each segment is assigned a training class of either a line or an arc. Using only two functions minimizes the decisions during classification. The lack of the complexity enhances the invention, by among others, allowing a simpler classification scheme and simplified computations of "best-fit" functions. It should be evident, however, that other functions, such as hyperbola and parabolas can also be used. Further, methods that parse segments into straight lines, corners, circular arcs, and notches or any variation thereof can be adapted and will achieve many of the benefits of the invention.

Any segment that fails the arc classification is a line.

Any segment that has less than 4 data points is classified as a line.

A segment is classified as an arc when the angle of the local tangent from points within the segment generally consistently increase or decrease, such as from 920 to 922 and from 922 to 908, and the angle change from more extreme points within the segment, such as point 920 to 908, exceed a threshold, such as 10°, for example.

Alternative methods for determining if a segment is an arc can also be used as should be evident to those skilled in the art, including for example, looking at the length of the segment and the scatter or points around the segment.

The order of refining endpoints (818) and assignment (814) is inconsequential.

The output of the parse, merge and refinement is a more accurate indexed set of vertices for both runtime and traintime (820). The indexing is maintained using the conventions described earlier. In one embodiment, the traintime parse is enhanced by running a few objects through the method and choosing the traintime parse of the object with the smallest defects as shown in step (218) in FIG. 2. It should be apparent that some or all of the segments can be connected or represent more than one object.

In further aspects, the output of the parse (820) can be used for other vision processes outside of boundary analysis, either alone or in combination with the matching and refinement of the segmentation steps of a preferred embodiment.

Those skilled in the art will also realize that using reduced-resolution images to generate the set of vertices, and/or match the vertices, for example, could decrease processing time. Further any combination of full-resolution and reduced-resolution images can be used. However, use of reduced-resolution images typically results in a loss of accuracy.

Those skilled in the art will realize that processing time can also be decreased by performing any of the computations described herein using sampled data, such as generating best-fit equations from sampled data, determining the angle of the data points, determining the curvature of segments from sampled data, determining statistical information, and finding orientation, origin position, or scale of the runtime image from sampled data, for example. Sampled data is a subset of the available data points, such as every third data point, for instance.

Those skilled in the art will realize that any two boundaries can be compared using this invention, and that using a model boundary from traintime and a boundary from runtime is only one application. For instance, the boundary of an object can be analyzed over a sequence of process steps, wherein the traintime segments would represent the earlier step, and the runtime segments would represent the later step or steps. Depending upon the requirements of the inspection or correlation completed by the method, the traintime segments could be continually updated and the latest boundary matched against an earlier step or the initial step.

Those skilled in the art will appreciate that some, or all, of the steps of creating indexed vertices, matching, refining the segmentation, and measuring described herein before can be combined and effected as hardware implementations, software implementations or a combination thereof, and that although one vision system described is implemented with a Cognex vision system and vision tools, the invention can be implemented on other platforms, such as general purpose computers running software and/or configured with hardware to effect the functionality described herein.

Furthermore, while operations described herein use a runtime image and a traintime image, it should be appreciated that any of the images described herein can be subject to further processing, such as by filtering using a gaussian filter, median filter, smoothing filter, morphological filter or the like known in the art, in order to improve image quality.

Other modifications and implementations will occur to those skilled in the art without departing from the spirit and the scope of the invention as claimed. Accordingly, the above description is not intended to limit the invention except as indicated in the following claims.

What is claimed is:

1. A method for measuring deviations in an object boundary of an object within an image, the method comprising:
   a. providing a first set of first segments, each first segment having indexed first vertices and a class, the first set representing a first boundary of the object;
   b. segmenting a second set of second segments, each second segment having indexed second vertices, the second set representing the object boundary of the object;
   c. substantially matching at least some of the second vertices to at least some of the first vertices so as to produce matched second segments, each matched second segment being associated with a class of a corresponding matched first segment; and
   d. measuring deviations within the matched second segments using the class.

2. The method of claim 1, wherein the first segments are connected.

3. The method of claim 1, wherein first vertices are approximately end points of each of the first segments.

4. The method of claim 3, wherein the set of first segments include at least one line and at least one arc.

5. The method of claim 4, wherein each of the at least one arc has a radius of curvature.

6. The method of claim 1, wherein generating a first set of first segments includes:
   acquiring a first boundary of a first object; and
   parsing the first boundary into a set of indexed primitives.

7. The method of claim 1, wherein generating a first set of first segments includes:
   applying steps b–d on multiple images of the object; and
   choosing as the first boundary the second segments having smaller deviations.

8. The method of claim 1, wherein generating a first set of first segments includes:
   merging neighboring first segments having similar statistics; and refining first segments by reassigning at least one data point of a first segment among neighboring first segments.

9. The method of claim 1, wherein generating a second set of second segments includes:

determining an object boundary of the object; and parsing the object boundary into second segments each having second vertices.

10. The method of claim 1, wherein the object boundary is determined to sub-pixel precision.

11. The method of claim 1, wherein matching substantially at least some of the second vertices to at least some of the first vertices includes:

matching one of the second vertices with one of the first vertices when the second vertex is indexed similarly to the first vertex.

12. The method of claim 1, wherein matching substantially at least some of the second vertices to at least some of the first vertices includes:

matching one of the second vertices with one of the first vertices when the second vertex is within a predetermined spatial tolerance of the first vertex.

13. The method of claim 1, wherein matching substantially at least some of the second vertices to at least some of the first vertices includes:

ignoring second vertices that are not within a predetermine spatial tolerance of one of the first vertices.

14. The method of claim 1, further comprising:

e. refining the segmentation of the object boundary of the object after matching so as to increase an amount of the matched second segments; and f. repeating step c after refining.

15. The method of claim 14, wherein the second set of second segments includes the matched second segments and unmatched second segments, and the first vertices includes matched first vertices and unmatched first vertices, and wherein refining includes:

dividing the unmatched second segments to create additional second vertices positioned as close as possible to the unmatched first vertices so as to increase an amount of the matched second vertices.

16. The method of claim 15, wherein each of the additional second vertices is a point on the object boundary of the object as close as possible to one of the unmatched first vertices.

17. The method of claim 14, wherein refining includes:

combining unmatched second segments that neighbor one another so as to increase an amount of the matched second segments.

18. The method of claim 1, wherein the deviations have a sub-pixel magnitude in at least one dimension.

19. The method of claim 1, for automatically inspecting boundaries of multiple objects wherein the image contains more than one object.

20. The method of claim 1, further comprising:

rotationally aligning the object boundary with the first boundary before matching.

21. The method of claim 1, wherein measuring deviations include:

generating an ideal segment using the class and the second vertices; and measuring any deviation of the second segment from the ideal segment.

22. The method of claim 1, wherein measuring deviations include:

generating an ideal segment using the class and the second segments; and measuring any deviation of the second segment from the ideal segment.

23. The method of claim 22, wherein generating an ideal segment includes:

determining an equation of a line that best fits data of the second segment.

24. The method of claim 22, wherein generating an ideal segment includes:

determining an equation of an arc that best fits data of the second segment so as to produce a best-fit center and a best-fit radius;

determining radii from the best-fit center to at least two data points on the second segment;

subtracting the best-fit radius from each of the radii so as to produce a delta value over length of the second segment;

plotting the delta value over length of the second segment; and measuring any deviation of the delta value from a straight line.

25. The method of claim 24, where measuring any deviation from an ideal segment includes:

rotating the delta value so as to somewhat align the delta value with an axis; and measuring any deviation of the delta value from a straight line includes:

measuring any deviation from the axis.

26. An apparatus for measuring deviations in an object boundary of an object within an image, the apparatus comprising:

an index device adapted to generate a first set of first segments, each first segment having indexed first vertices and a class, the first set representing a first boundary of the object, and the index device also being adapted to generate a second set of second segments, each second segment having indexed second vertices, the second set representing the object boundary of the object;

a matching device, cooperative with the index device, adapted to substantially match at least some of the second vertices to at least some of the first vertices so as to produce matched second segments, each matched second segment associated with a class of matched first segments; and an analyzer, cooperative with the matching device, adapted to measure deviations in at least some of the second segments having the matched second vertices using the class associated with the matched second vertices and the data points of the second segments.

27. The apparatus of claim 26, further comprising a resegmenter, cooperative with the matching device, adapted to resegment unmatched second segments so as to increase an amount of the matched second segments.

28. A method for analyzing an object boundary of an object within an image, the method comprising:

a. generating a set of first segments each having indexed first vertices, the set representing a first boundary of the object;

b. generating a set of second segments each having indexed second vertices representing the object boundary of the object;

c. substantially matching at least some of the second vertices to at least some of the first vertices so as to produce matched second and first segments;

d. refining the segmentation of unmatched second segments to match with unmatched first segments so as to produce additional matched second and first segments; and e. analyzing the object boundary of the object using the matched second and first segments.

29. The method of claim 28, wherein analyzing the object boundary of the object includes:

calculating a number of unmatched second segments so as to generate a score of similarity between the first boundary and the object boundary.

30. The method of claim 28, wherein each first segment has a class and wherein analyzing the object boundary of the object includes:

measuring deviations in at least some of the second segments having the matched second vertices using a class associated with the matched first segments.

31. An apparatus for measuring deviations in an object boundary of an object within an image, the apparatus comprising:

an index device adapted to generate a first set of first segments, each first segment having indexed first vertices, the first set representing a first boundary of the object, and adapted to generate a second set of second segments, each second segment having indexed second vertices, the second set representing the object boundary of the object;

a matching device, cooperative with the indexing device, adapted to substantially match at least some of the second vertices to at least some of the first vertices so as to produce matched second and first segments;

a resegmenter, cooperative with the matching device, adapted to resegment unmatched second segments to match with unmatched first segments so as to produce additional matched second and first segments; and an analyzer, cooperative with the resegmenter, adapted to analyze the object boundary of the object using the matched second and first segments.

32. The apparatus of claim 31, wherein each first segment has a class and the analyzer further includes:

a measuring device adapted to measure deviations in at least some of the second segments having the matched second vertices using a class associated with the matched first segments and data points of the runtime segments.

33. The apparatus of claim 31, wherein the analyzer further includes:

a scoring device for calculating a number of unmatched second segments so as to generate a score of similarity between the first boundary and the object boundary.

34. A method for measuring deviations in an object boundary of an object within an image, the method comprising:

providing a first set of first segments, each one of the first segments having indexed first vertices and a class, the first set representing a trained boundary of the object;

providing a second set of second segments, each one of the second segments having indexed second vertices, the second set representing the object boundary of the object in the image;

substantially matching at least some of the indexed second vertices with at least some of the indexed first vertices so as to produce matches for at least a portion of the second segments, each of the matches including at least two of the indexed first vertices, and each of the matches being associated with the class of the one of the first segments having the respective at least two of the indexed first vertices; and measuring deviations within each of the at least a portion of the second segments of the matches using the respective class associated with each of the matches.

35. The method of claim 34, further comprising:

refining the second set of second segments before measuring the deviations so as to allow additional matches; and substantially matching at least some of the indexed second vertices with at least some of the indexed first vertices after the refining so as to produce the additional matches for at least a portion of the second segments, each of the additional matches having at least two of the indexed first vertices, and each of the additional matches being associated with the class of the one of the first segments having the respective at least two of the indexed first vertices, and wherein measuring the deviations further includes:

measuring the deviations within each of the at least a portion of the second segments of the matches and within each of the at least a portion of the second segments of the additional matches.

36. The method of claim 35, wherein the second set of second segments includes the at least a portion of the second segments in the matches and unmatched second segments, and the indexed first vertices includes matched first vertices and unmatched first vertices, and wherein refining further includes:

dividing at least a portion of the unmatched second segments to create additional second vertices positioned on the object boundary as close as possible to the unmatched first vertices.

37. The method of claim 35, wherein the second set of second segments includes the at least a portion of the second segments in the matches and unmatched second segments, and wherein refining includes:

combining any of the unmatched second segments that neighbor one another.

38. The method of claim 34, wherein the set of first segments include at least one line and at least one arc.

39. The method of claim 34, wherein providing the first set of first segments further includes:

merging neighboring first segments within the set of first segments having similar statistics.

40. The method of claim 34, wherein the first segments have data points and wherein providing the first set of first segments further includes:

refining the data points within at least one of the first segments by reassigning at least one of the data points of the at least one of the first segments to a neighboring one of the first segments.

41. The method of claim 34, wherein substantially matching the at least some of the indexed second vertices with the at least some of the indexed first vertices includes:

matching an indexed second vertex with an indexed first vertex when the indexed second vertex is within a predetermined spatial tolerance of the indexed first vertex.

42. The method of claim 34, wherein providing the second set of second segments further includes:

providing a fourth set of unrefined segments, each one of the unrefined segments having indexed unrefined vertices, the unrefined set representing the object boundary of the object in the image;

substantially matching at least some of the indexed unrefined vertices with at least some of the indexed first vertices, any potential matches for a portion of the unrefined segments having at least two of the indexed first vertices; and combining at least a portion of the unrefined segments that neighbor one another and that are not in the any potential matches so as to produce combined segments and so as to provide the second set of second segments, where the second segments include the portion of the unrefined segments in the any of the potential matches and the combined segments.

43. The method of claim 34, wherein providing the second set of second segments further includes:

providing a third set of unrefined segments, each one of the unrefined segments having indexed unrefined vertices, the unrefined set representing the object boundary of the object in the image;

substantially matching at least some of the indexed unrefined vertices with at least some of the indexed first vertices, any potential matches for a portion of unrefined segments having at least two of the indexed first vertices; and creating additional indexed vertices within at least a portion of the unrefined segments that are not in the any potential matches, the additional indexed vertices positioned on the object boundary as close as possible to one of the indexed first vertices, so as to provide the second set of second segments, where the indexed second vertices include the indexed unrefined vertices and the additional indexed vertices, and where the second segments are defined thereby.

44. The method of claim 34, further comprising:

rotationally aligning the object boundary with the trained boundary before matching.

45. The method of claim 34, wherein measuring the deviations further includes:

generating an ideal segment between the indexed second vertices, using the respective class, for each of the at least a portion of the second segments of the matches; and measuring any deviation of each of the at least a portion of the second segments from the respective ideal segment.

* * * * *